United States Patent [19]

O'Brien

[11] Patent Number: 4,480,388
[45] Date of Patent: Nov. 6, 1984

[54] APPARATUS FOR THREE-WIRE METHOD OF THREAD PITCH DIAMETER MEASUREMENT

[76] Inventor: Orlin P. O'Brien, 9205 Main St., Whitmore Lake, Mich. 48189

[21] Appl. No.: 490,561

[22] Filed: May 2, 1983

[51] Int. Cl.³ .............................................. G01B 3/40
[52] U.S. Cl. ................................ 33/199 R; 33/147 M
[58] Field of Search ............ 33/199 R, 199 B, 147 M, 33/167

[56] References Cited

U.S. PATENT DOCUMENTS 2,939,220  6/1960  Croshier et al. ...................... 33/167

FOREIGN PATENT DOCUMENTS 473640  8/1952  Italy ................................... 33/199 R
107855  7/1917  United Kingdom .................. 33/167

Primary Examiner—Harry N. Haroian
Attorney, Agent, or Firm—Stephenson and Boller

[57] ABSTRACT

A holder for use in a three-wire measurement of thread pitch diameter comprises a pair of holder elements for holding respective ones of the three wires. The holder elements are generally rectangular in shape and are relatively movable toward and away from each other in a straight line in the direction of the diameter across which the measurement is being taken. The holder elements support measuring wires in parallel planes diametrically on opposite sides of the thread. Each holder element is provided with a central aperture providing access to the wires at their points of contact with the thread so that a micrometer measurement across the three wires is obtained. The pitch diameter is calculated from the micrometer measurement and the diameter of the wires.

13 Claims, 4 Drawing Figures

APPARATUS FOR THREE-WIRE METHOD OF THREAD PITCH DIAMETER MEASUREMENT

BACKGROUND AND SUMMARY OF THE INVENTION

This invention relates to the three-wire method of thread pitch diameter measurement, and it is more particularly concerned with a new and improved apparatus for use in practice of this method.

The three-wire method of thread pitch diameter measurement is a known procedure used to measure the pitch diameter of a thread, for example during machining of a thread. The method comprises the use of a set of three wires of uniform circular cross section which are of the same known diameter. Two wires are positioned on one side of the pitch diameter being measured and disposed in immediately adjacent convolutions of the thread root at the same circumferential point about the thread axis while the other wire is disposed on the exact diametrically opposite side in the portion of the root convolution which is between the first two wires. The wires do not seat fully within the roots but rather each wire is disposed against a flank of the immediately adjacent crest convolutions which lie on each side of the root convolution.

According to the theory of three line pitch diameter measurement, an accurate pitch diameter measurement can be obtained across the three wires at their points of tangency with the thread if the points of tangency of the two wires on one side are exactly the same and that of the single wire on the opposite side is exactly 180° from the points of tangency of the first two wires. Through knowledge of the diameters of the wires and a micrometer measurement across the three wires, the pitch diameter of the thread may be calculated.

In order to obtain an accurate measurement, it is important that the wires be located in the manner explained above. Manual procedures for manipulating the wires and holding them in the desired positions for accurate measurement are difficult. Hence, it may not be possible to obtain consistently accurate measurements unless one is very skilled in the procedure, and therefore, various types of apparatus for use in holding and manipulating the wires have heretofore been proposed. Examples of these are illustrated in the following U.S. patents which were developed in connection with a novelty search conducted relative to this invention.

U.S. Pat. No. 2,554,024
U.S. Pat. No. 2,663,948
U.S. Pat. No. 2,692,438
U.S. Pat. No. 2,741,035
U.S. Pat. No. 2,939,220
U.S. Pat. No. 2,962,817
U.S. Pat. No. 3,068,582
U.S. Pat. No. 3,253,340

U.S. Pat. No. 3,253,340 comprises a mechanism which resiliently holds the wires by means of jaw-like elements and which is adjustable while maintaining the held wires in parallel planes.

U.S. Pat. No. 2,663,948 illustrates another type of holder which maintains the held wires parallel.

U.S. Pat. No. 2,554,024 illustrates another type of wire holder with adjustment capabilities.

U.S. Pat. No. 3,068,582 illustrates a holder containing grooves for locating the wires.

The present invention is directed to a new and improved apparatus for use with the three-wire method of thread pitch diameter measurement. In particular, it comprises an arrangement and construction which facilitates the mounting of the wires and their accurate application to a thread whose pitch diameter is to be measured.

One important feature of the invention is that it does not have a complicated construction, yet it is capable of quickly and accurately locating wires for use in the three-wire method so that an accurate measurement can be quickly obtained. Another feature is that any given embodiment of the invention can accommodate a number of wires of varying diameters and hence it is unnecessary to have an individual embodiment for each three-wire set. Moreover, the construction is such that varying diameters and pitches can be measured with a given embodiment of the invention. The wires can be readily inserted and changed and the apparatus adjusted as required for different measurements.

Briefly, the preferred embodiment of the invention comprises a pair of holder elements which are guided for relative straight line movement toward and away from each other in the direction of the measured diameter. The holder elements, which are of a generally rectangular shape, comprise wire-engaging surfaces which are parallel and confront each other. One wire is disposed against the wire-engaging surface of the one holder element and the other two wires against the wire-engaging surface of the other holder element. Retention of the wires on the holder elements is accomplished by means of rubber bands. The holder elements also define locating slots which generally locate the wire elements so that they will be generally tangent to the fastener, yet the construction is such that different thread sizes may be measured with the same holder and different wire diameters may also be used. The two holder elements are resiliently urged together to urge the wires against the opposite sides of the thread pitch diameter being measured while ensuring that the wires on opposite sides are disposed in parallel planes. Circular apertures extend through the two holder elements, passing through the wire-engaging surfaces thereof, to provide access to the three wires at their points of tangency with the thread being measured so that a measuring instrument may be engaged via the apertures with the three wires at their points of tangency with the thread to obtain an accurate measurement.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
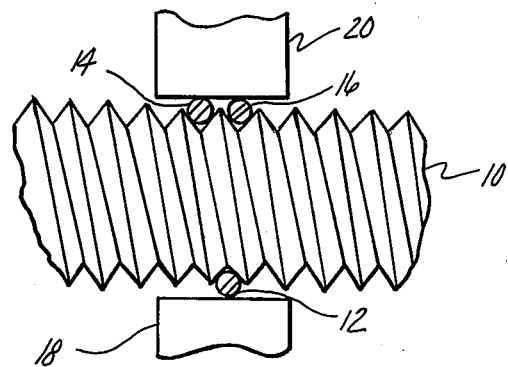
FIG. 1 illustrates the three-wire method of thread pitch diameter measurement.

FIG. 1 illustrates the three-wire method of thread pitch diameter measurement. A threaded member 10 whose pitch diameter is being measured by the three-wire method is shown in a fragmentary longitudinal view, and the three wires 12, 14 and 16 are illustrated in cross section at their respective points of contact with the thread. In other words, the wires 12, 14 and 16 are disposed generally tangential to the member 10 but the wires themselves will not be at right angles to the plane of the drawing FIG. 1 because they will align with the thread at their respective points of tangency. Hence, in FIG. 1 the wires 14 and 16, if extended toward the reader out of the plane of the paper, will incline toward the right while the wire 12, if projected out of the plane of the paper toward the reader, will incline to the left.

The three wires, 12, 14 and 16 constitute a set in which the wires are all of the same known circular diameter. Typically, general machining purposes will utilize a number of different three-wire sets of different wire sizes to accommodate different thread dimensions.

The set of wires 12, 14 and 16 is selected to fit within the root of the thread such that at each point of tangency of a wire with the fastener, the O.D. of the wire contacts the flanks of the immediately adjacent convolutions of the crest of the thread but without contacting the base of the root. Furthermore, the wires protrude radially outwardly of the peak of the crest of the thread so that a measurement can be made by means of a micrometer. FIG. 1 shows the micrometer anvil 18 and adjustable tip 20 (i.e., the measuring throat of the micrometer) taking measurement across the three wires.

As explained earlier, the theory of the three-wire measurement comprises the wires on each side of the pitch diameter lying in parallel planes on each side of the thread at the points of tangential contact. In other words, the two wires 14 and 16 must contact immediately adjacent convolutions of the thread at the same circumferential point about the axis of the thread and the wire 12 must tangentially contact the thread at a point exactly 180° circumferentially from the points of contact of the wires 14 and 16 with the thread. Wire 12 is located at the midpoint (i.e. 180°) of the convolution between the points of contact of wires 14 and 16 with the thread so that wire 12, at its point of contact with the thread, is exactly half-way between the two wires 14 and 16 at points of contact with the thread, as measured axially along the length of the thread.

Figure 2:
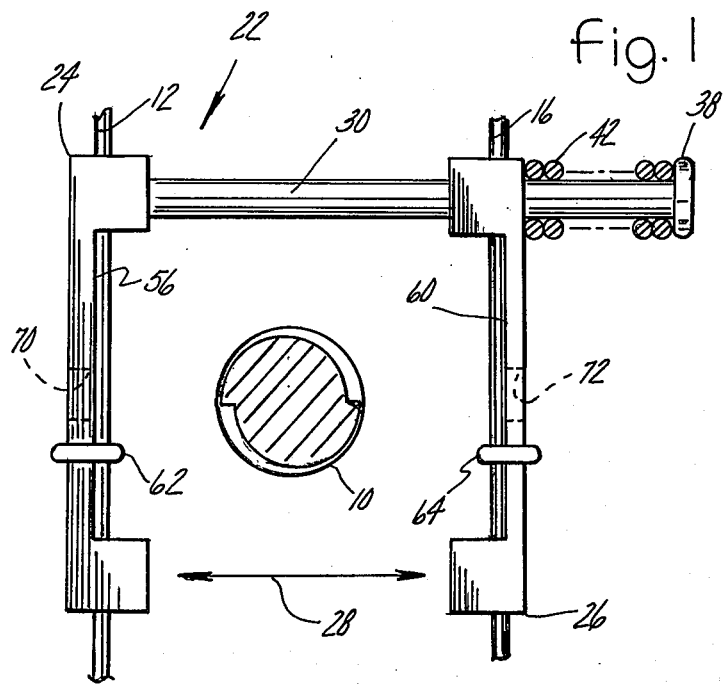
FIG. 2 illustrates the apparatus of the present invention in use in the three-wire method and is taken in a view from one axial end of a thread whose pitch diameter is being measured.
Figure 3:
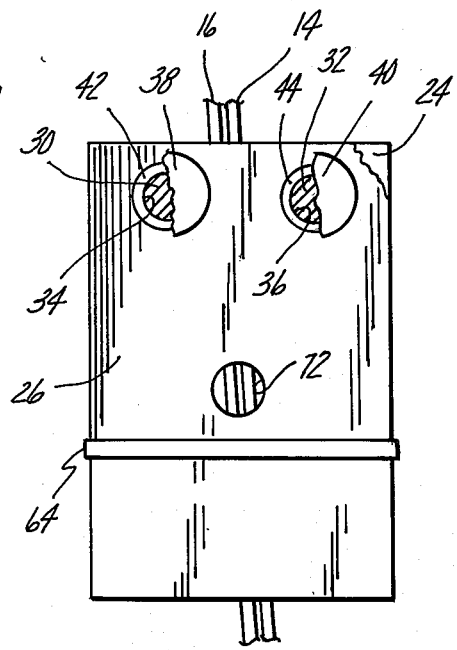
FIG. 3 is a right side view of FIG. 2, portions being broken away.
Figure 4:
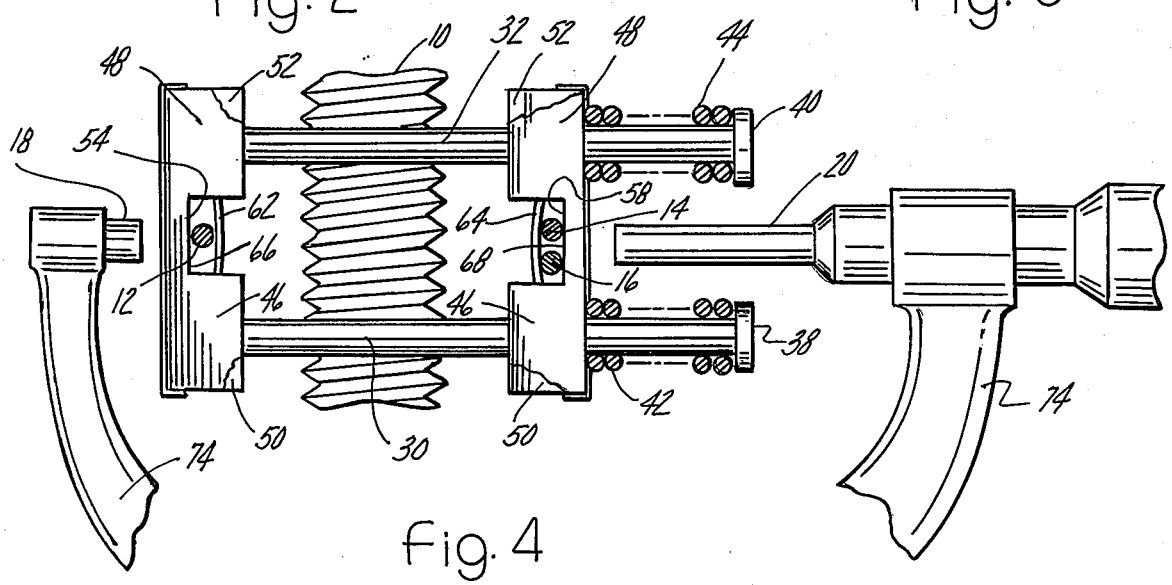
FIG. 4 is a top view of FIG. 2, portions being broken away, and illustrating the use of a measuring gage as well.

FIGS. 2, 3 and 4 illustrate the apparatus 22 of the present invention which is used in the three-wire method of pitch diameter measurement. The apparatus 22 comprises a pair of holder elements 24 and 26 respectively. As can be seen in FIG. 3, these elements have generally rectangular shapes. The two holder elements 24, 26 are guided for relative straight line movement, indicated by the double headed arrow 28, toward and away from each other by means of guide and guideway structure.

The guide and guideway structure comprises a pair of spaced apart, parallel, circular cylindrical guide members 30 and 32 respectively whose left hand ends as viewed in FIG. 2 mount by any suitable means on the left hand holder element 24. The guide members 30 and 32 therefore project perpendicularly away from the general rectangular shape of holder element 24.

The right hand holder element 26 is provided with a pair of circular apertures 34 and 36 respectively which are spaced apart and whose axes are parallel. These apertures are spaced apart the same distance as the spacing of guide members 30 and 32 and allow the right hand holder element 26 to fit onto and slide along the guide members in the directions of arrow 28.

Guide members 30 and 32 project to the right, as viewed in FIG. 2, beyond the right hand holder element 26 and the far right hand distal end of each guide member is provided with a head 38 and 40 respectively.

A helically coiled compression spring 42, 44 is disposed around the corresponding guide member 30, 32 and each is disposed between the corresponding head 38, 40 and holder element 26.

FIG. 2 illustrates a condition in which the two holder elements are separated such that the springs 42, 44 are compressed. The springs will normally urge the two holder elements together in abutment but they resiliently allow them to be separated for use of the holder in the three-wire method.

As can be seen in the drawing figures, the two rectangular shaped holder elements are arranged with their four corners in alignment. Integral projections are provided at the four corners of each holder element projecting toward the corresponding corners of the opposite holder element. For convenience these projections are designated by the reference numerals 46, 48, 50 and 52 for each of the two holder elements. The projections themselves are of rectangular shape so that when the two holder elements are in the position of abutment, each projection abuts its corresponding counterpart of the opposite holder element.

The four projections of each holder element define a pair of intersecting slots which intersect centrally of the holder element and which are at right angles to each other. These slots face the opposite holder element. In the case of holder element 24 the two intersecting slots are identified by the reference numerals 54 and 56 respectively while in the case of holder element 26 they are designated by the numerals 58 and 60 respectively. As can be seen from comparison of FIGS. 2 and 4 the slots 54 and 58 are considerably narrower in width than are the slots 56 and 60 although all slots have the same depth as measured from the abutment surfaces of the four corner projections.

The slots 54, 58 form wire locating regions for locating the corresponding measuring wires on the respective holder elements. The wires are retained on their respective holders by means of respective rubber bands 62 and 64. In particular with the wires placed in the respective holder elements as illustrated in FIGS. 2–4, it can be perceived that the wires are located by the slots 54, 58 so as to be in a general tangency condition when the holders are operated to engage the wires on the thread. The dimensions of the slots 54 and 58 are chosen however to accommodate a range of different wire sizes and they also can accommodate different thread pitches. For example in FIG. 2 it is apparent that the inclination of the wires will be a function of the pitch of the thread being measured. The holder elements accurately hold the wires in parallel planes on opposite diametrical sides of the thread, yet the wires can be conveniently manipulated within their rubber band retention.

The rubber band retention is such that the rubber bands are fitted over the rectangular shaped holder elements between the longer of their two sides. As such, a segment of each rubber band extends through the corresponding slot 56, 60 as is apparent in FIG. 2, and it is this segment of each rubber band which engages the corresponding wire or wires.

The bases of the slots 54 and 58 are identified by the numerals 66 and 68 respectively and are parallel surfaces against which the wires are disposed. As such they constitute wire engaging surfaces at 90° to the pitch diameter being measured which support the lengths of the wires on both sides of each wire relative to the wire's tangential contact with thread 10.

The holder elements 24, 26 further comprise respective circular apertures 70 and 72. These apertures are provided at the center of each rectangular element, and the two apertures are preferably in direct alignment with the diameter of the thread across which the measurement is being taken. However, because of the nature of the apparatus 22, in supporting the wires, precise alignment is not critical. Each respective rubber band, it will be observed, is disposed to one side of the corresponding aperture 70, 72.

In use, the holder elements including the retained wires are moved apart in the manner shown in FIG. 2 to allow the thread to be disposed between them. They are then allowed to move together under the urging of the springs 42, 44, so that the wires lodge in the appropriate convolutions of the thread root in the manner of FIG. 1. A micrometer 74 is then positioned in the manner shown in FIG. 4 so that the anvil 18 and measuring tip 20 pass through the respective apertures 70 and 72 to contact the wires in the manner of FIG. 1. The micrometer reading is then taken and on the basis of the reading and size of wires, the pitch diameter of the thread is calculated.

The apparatus of the invention is particularly convenient for quickly and accurately positioning the three wires in engagement with the thread for taking a measurement. The apparatus is also of an efficient and economical construction. Any given embodiment is able to accommodate a range of different wire sizes and different thread pitches.

The preferred construction of the apparatus comprises metal parts, with the exception of the rubber bands, and these parts are fabricated with precision to ensure parallelism of the wire-engaging surfaces 66, 68 over the range of travel indicated by the arrow 28.

Various techniques may be used in fabricating the holder. For example the guides 30 and 32 may be separate component parts which, during fabrication of the holder, are first passed through the apertures 34, 36 in holder element 26 and then affixed to the other holder element 24 by any suitable means.

Thus, the invention provides a useful device for individuals involved in three-wire measurement of pitch diameter.

While a preferred embodiment of the invention has been disclosed, it will be appreciated that principles of the invention are applicable to other embodiments.

What is claimed is:

1. Apparatus for the three-wire measurement of thread pitch diameter comprising in combination with three wires a holder comprising two separate holder elements for disposition on diametrically opposite sides of a thread whose pitch diameter is to be measured by the three-wire method, means mounting said two holder elements such that they are guided for relative straight line movement toward and away from each other in a direction aligned with the thread pitch diameter to be measured, said holder elements comprising parallel wire-engaging surfaces confronting each other and having extents at 90° to the direction of said relative straight line movement, one of said three wires being disposed against the wire-engaging surface of one of said holder elements and the remaining two wires being disposed against the wire-engaging surface of the other of said holder elements, retention means removably retaining said one wire on its corresponding holder element, further retention means removably retaining said remaining two wires on their corresponding holder element, and apertures extending through said wire-engaging surfaces of said holder elements in alignment with the thread pitch diameter to be measured, said wires passing across said apertures as viewed through said apertures, and said apertures providing access for a measuring instrument to be engaged with the three wires across the thread pitch diameter to be measured, each said holder element being of a generally rectangular shape with the two holder elements being aligned with each other corner-to-corner, each holder element including projections at its four corners projecting toward the four corners of the other holder element along the direction of said straight line movement so that when said holder elements are in abutment with each other at their projections, said parallel wire-engaging surfaces are spaced apart, and in which the four projections of each said holder element cooperatively define intersecting slots which face toward the opposite holder element, one slot of each said holder element providing a wire locating region within which a wire so located therein is oriented generally tangent to the thread pitch diameter to be measured, the other slot of each said holder element providing a region for location of the corresponding retention means.

2. Apparatus as set forth in claim 1 in which said first-mentioned retention means and said further retention means each comprises a rubber band.

3. Apparatus as set forth in claim 1 in which said apertures are located each at the center of the corresponding rectangular shaped holder element, said retention means and said further retention means each comprising a rubber band stretched onto the corresponding holder element with a segment of the corresponding stretched rubber band extending through the corresponding other slot and being spaced to one side of the corresponding aperture at its wire-retention location.

4. Apparatus as set forth in claim 3 in which said apertures are circular in shape and are in alignment with each other along an axis which is at a right angle to the axis of the thread whose pitch diameter is to be measured.

5. Apparatus as set forth in claim 1 in which said one slot of each said holder element is constructed and arranged to accommodate wires of different diameters and different thread pitches.

6. Apparatus as set forth in claim 1 including resilient means urging said two holder elements toward each other along the direction of said straight line movement, said resilient means being yieldable in response to relative displacement of said two holder elements away from each other along the direction of said straight line movement.

7. Apparatus as set forth in claim 1 in which said wires project lengthwise outwardly from said slots.

8. A holder for use in the three-wire measurement of thread pitch diameter comprising in combination with three wires two separate holder elements of generally rectangular shape and aligned corner-to-corner for disposition on diametrically opposite sides of a thread whose pitch diameter is to be measured by the use of two of said wires on one of said sides and the third wire on the other of said sides, means mounting said two holder elements such that they are guided for relative straight line movement toward and away from each other in a direction aligned with the thread pitch diameter to be measured, said holder elements comprising parallel wire-engaging surfaces confronting each other and having extents at 90° to the direction of said relative straight line movement to engage the wires on both sides of the point of contact of each wire with the thread pitch diameter to be measured, and apertures extending through said wire-engaging surfaces of said holder elements in alignment with the thread pitch diameter to be measured so as to provide access for a measuring instrument to be engaged with the three wires across the thread pitch diameter to be measured, each said holder element being provided with a slot formed therein and with the corresponding wire-engaging surface being at the bottom of the slot thereby to provide wire location regions within which said wires are oriented generally tangent to the thread pitch diameter to be measured, each said holder element is further provided with a further slot formed therein which intersects the corresponding first-mentioned slot and resilient retention means on said holder elements for removably retaining said wires in the respective slots each further slot providing a region for location of the corresponding resilient retention means.

9. A holder as set forth in claim 8 in which said apertures are circular and each is disposed at the center of the corresponding rectangular shaped holder element.

10. A holder as set forth in claim 8 in which said holder elements are guided for said relative straight line movement by guide structure on and projecting away from one of said holder elements at 90° to the plane of the rectangular shape of said one holder element, said other holder element comprising guideway structure engaging said guide structure.

11. A holder as set forth in claim 10 in which said guide structure comprises a pair of spaced apart parallel guides and said guideway structure comprises a pair of spaced apart holes in said other holder element, said guides passing through said holes.

12. A holder as set forth in claim 10 including resilient means yieldably urging said two holder elements toward each other along the direction of said straight line movement.

13. A holder as set forth in claim 9 in which said wires project lengthwise outwardly from said slots.

* * * * *